Patented Feb. 20, 1934

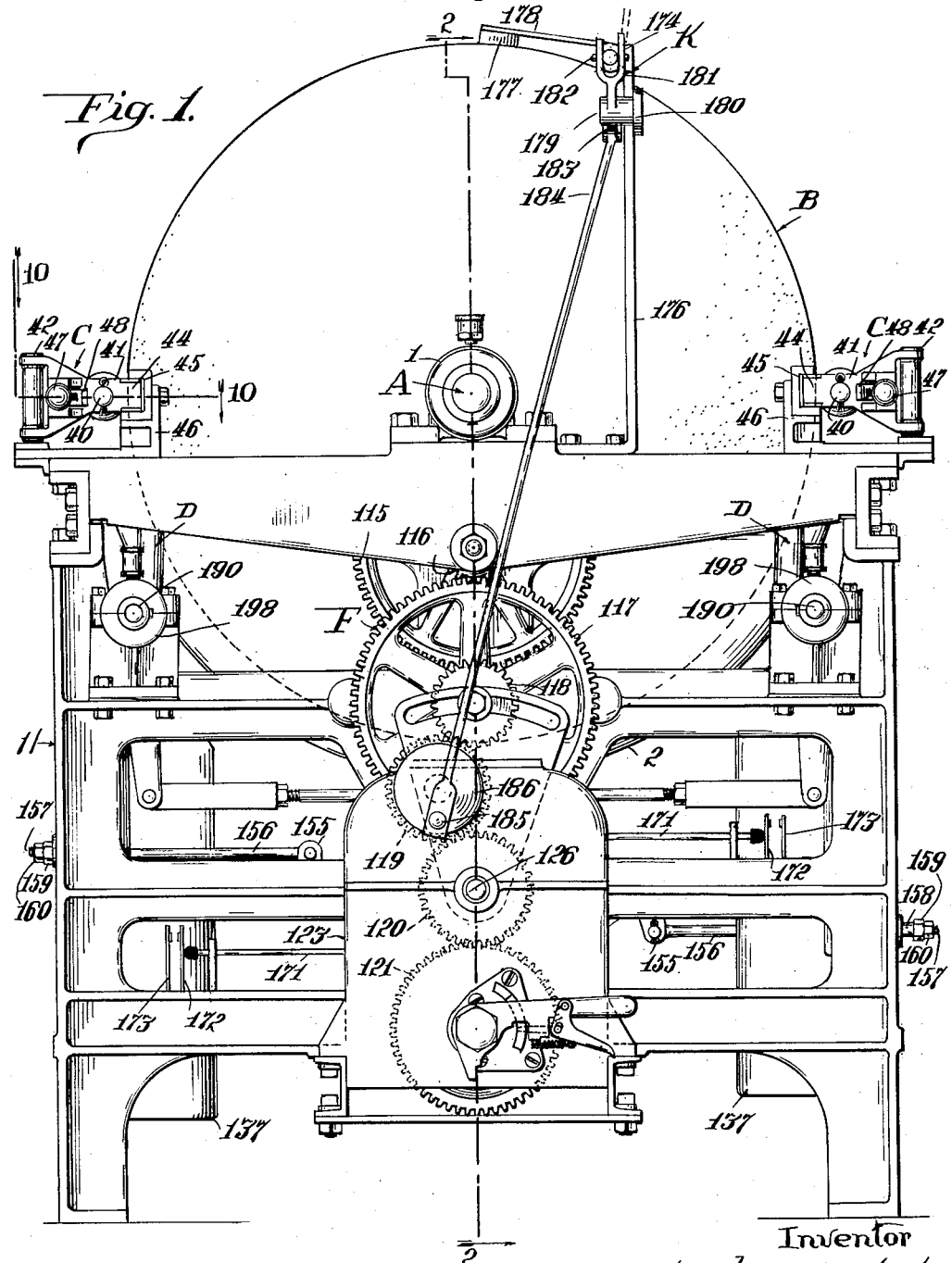

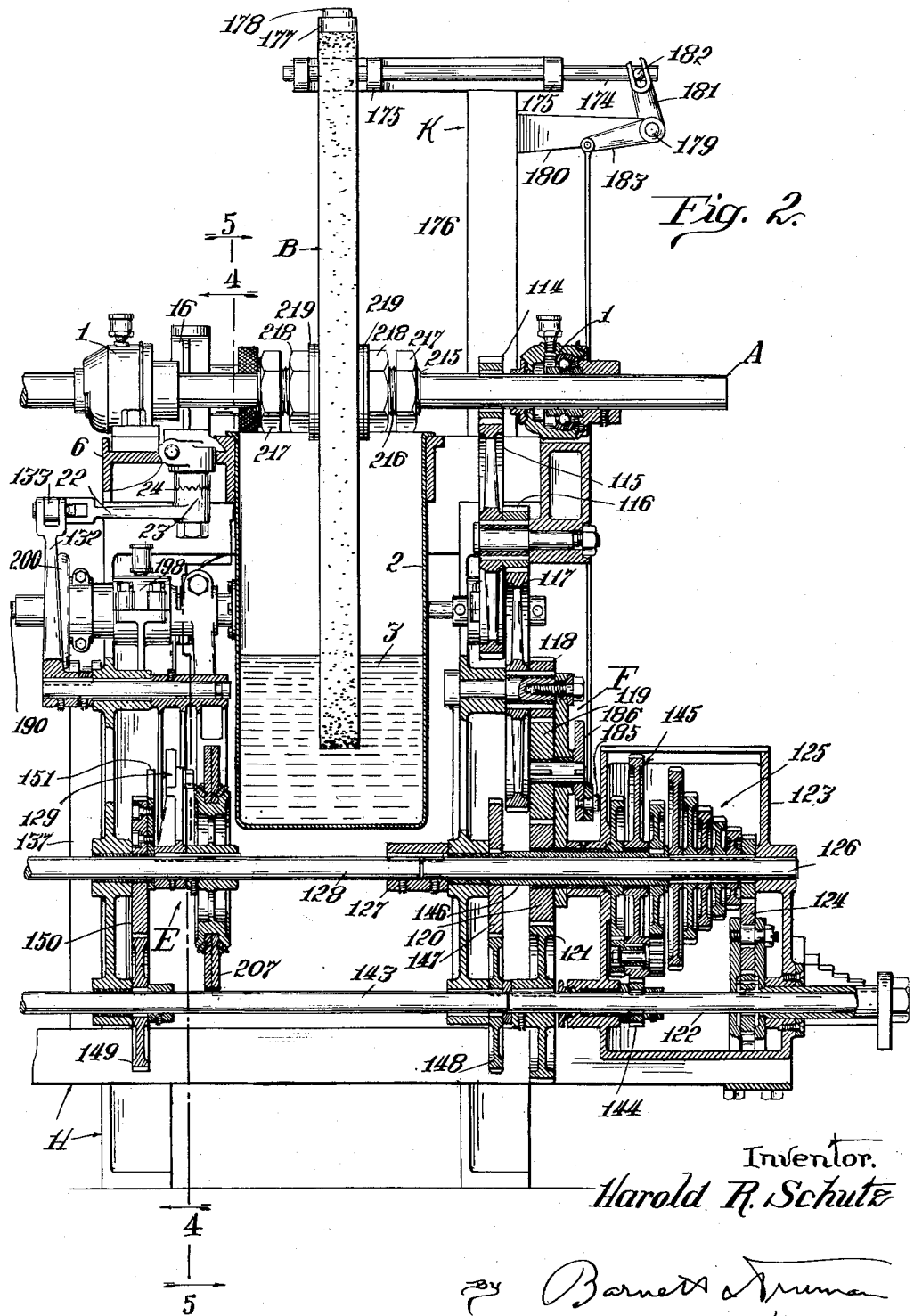

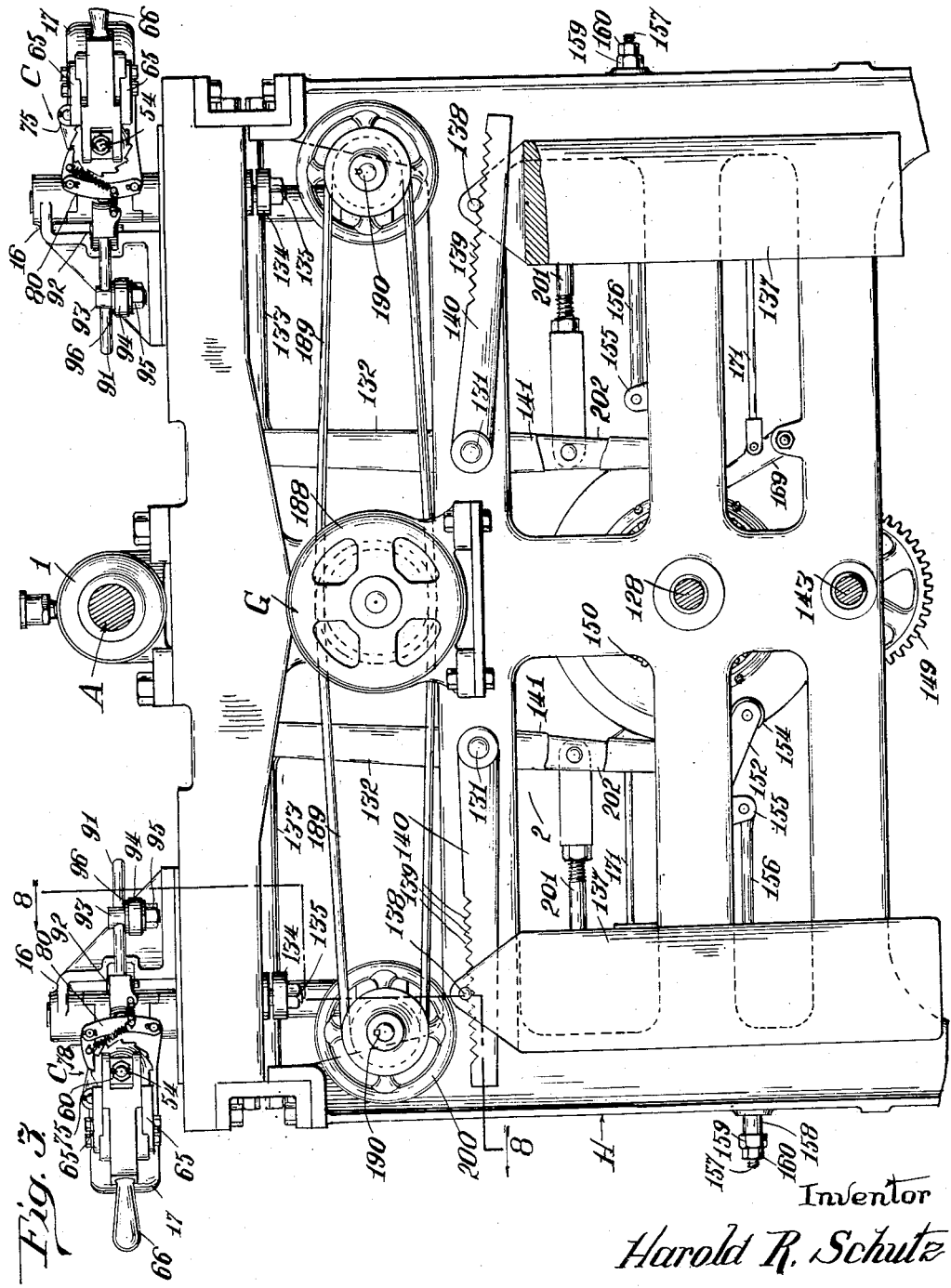

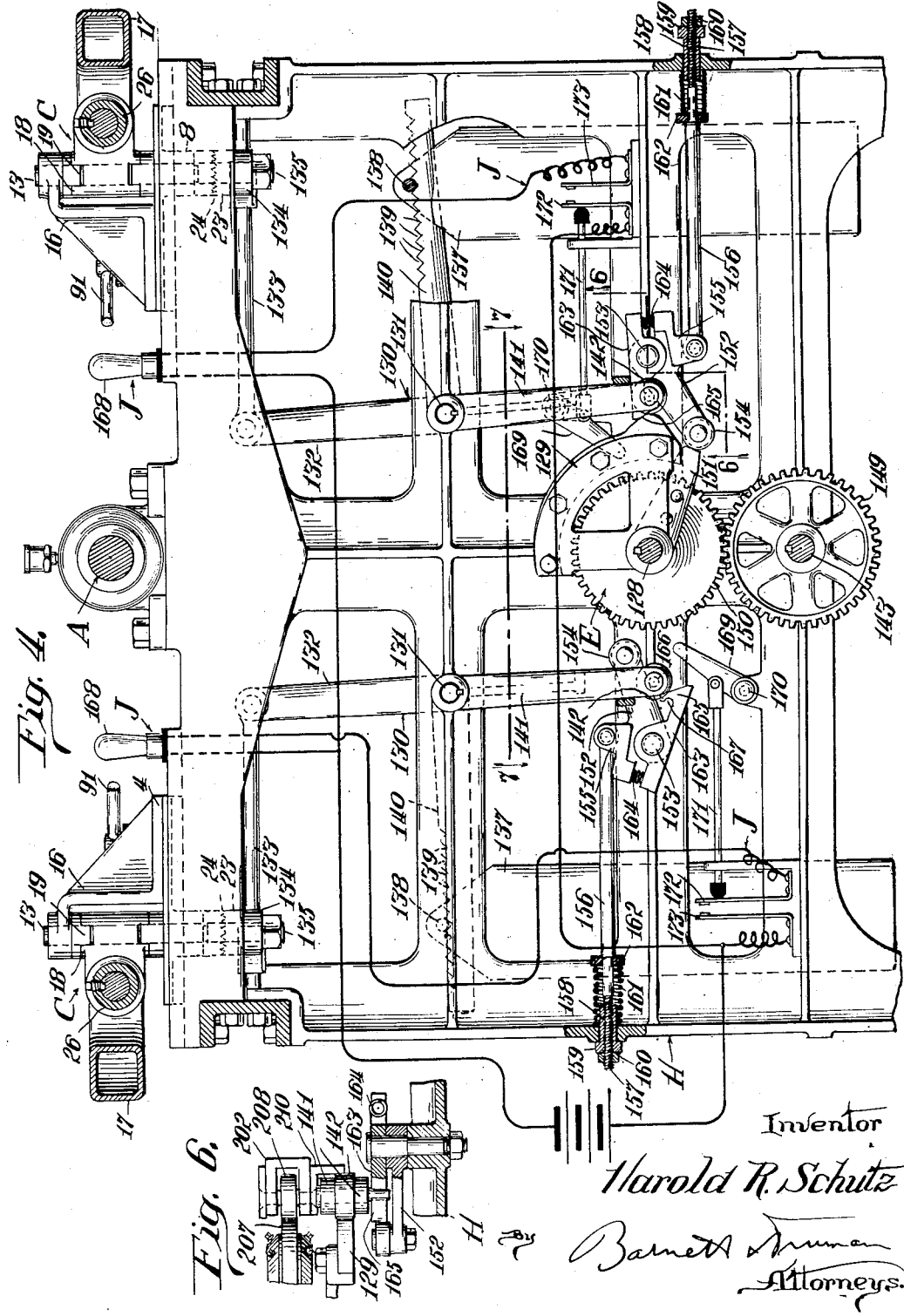

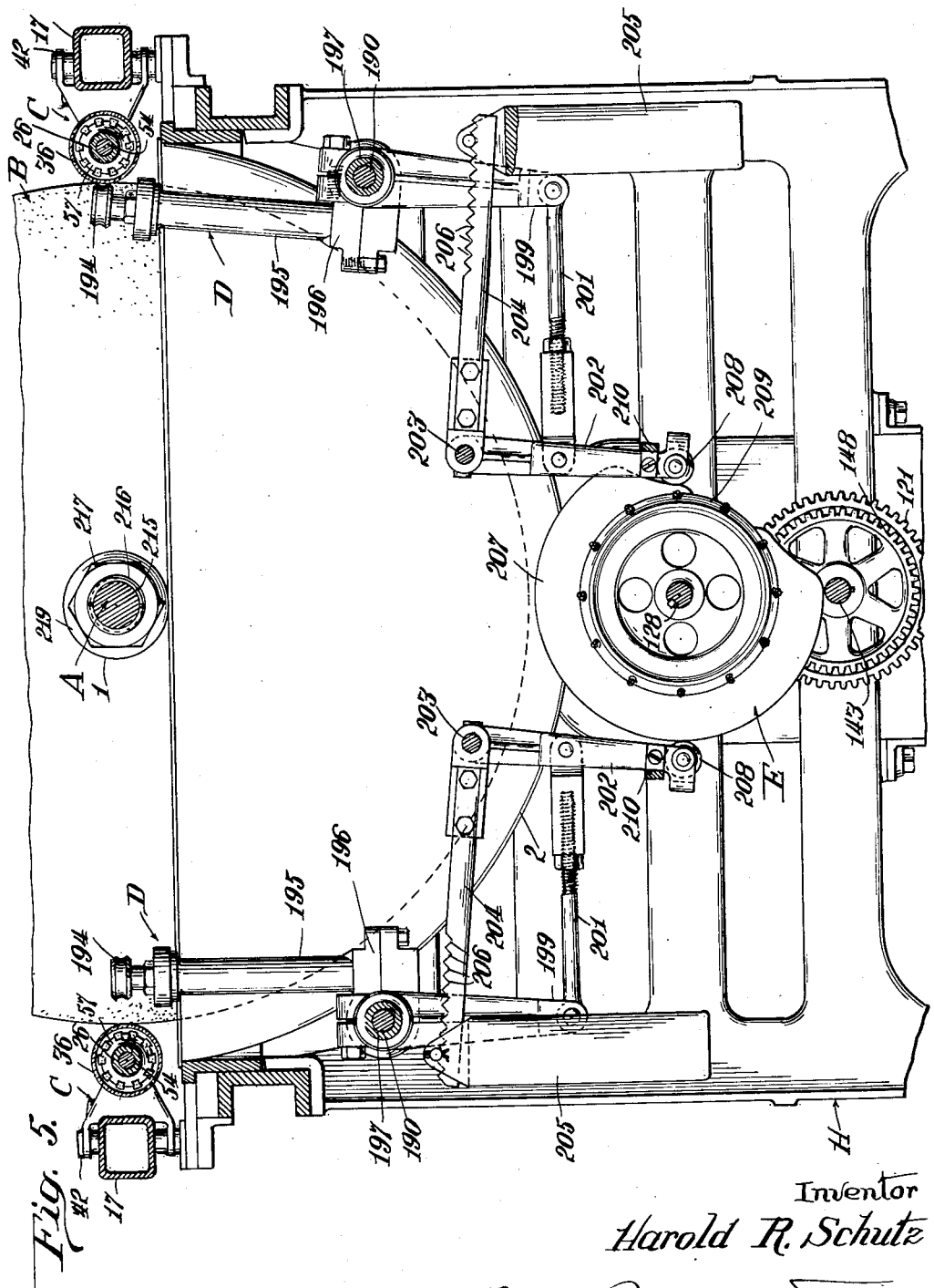

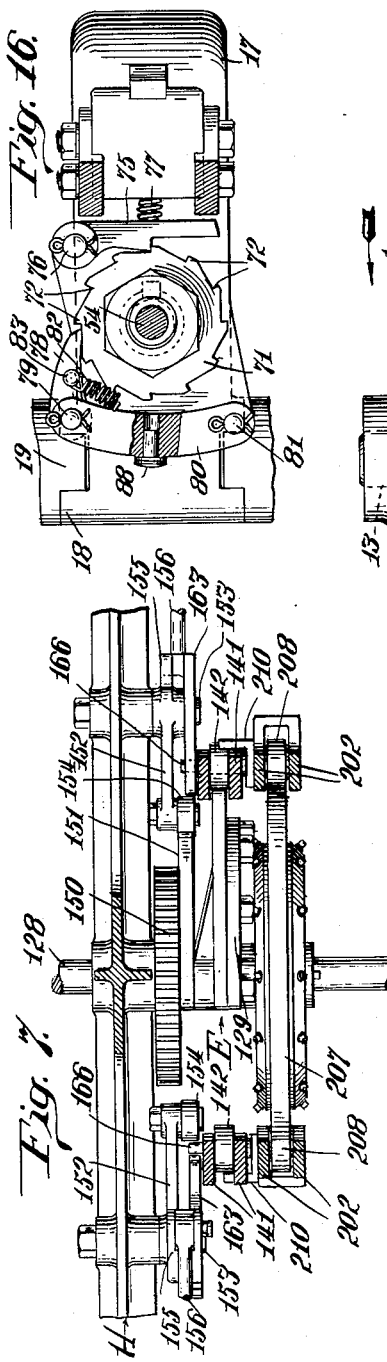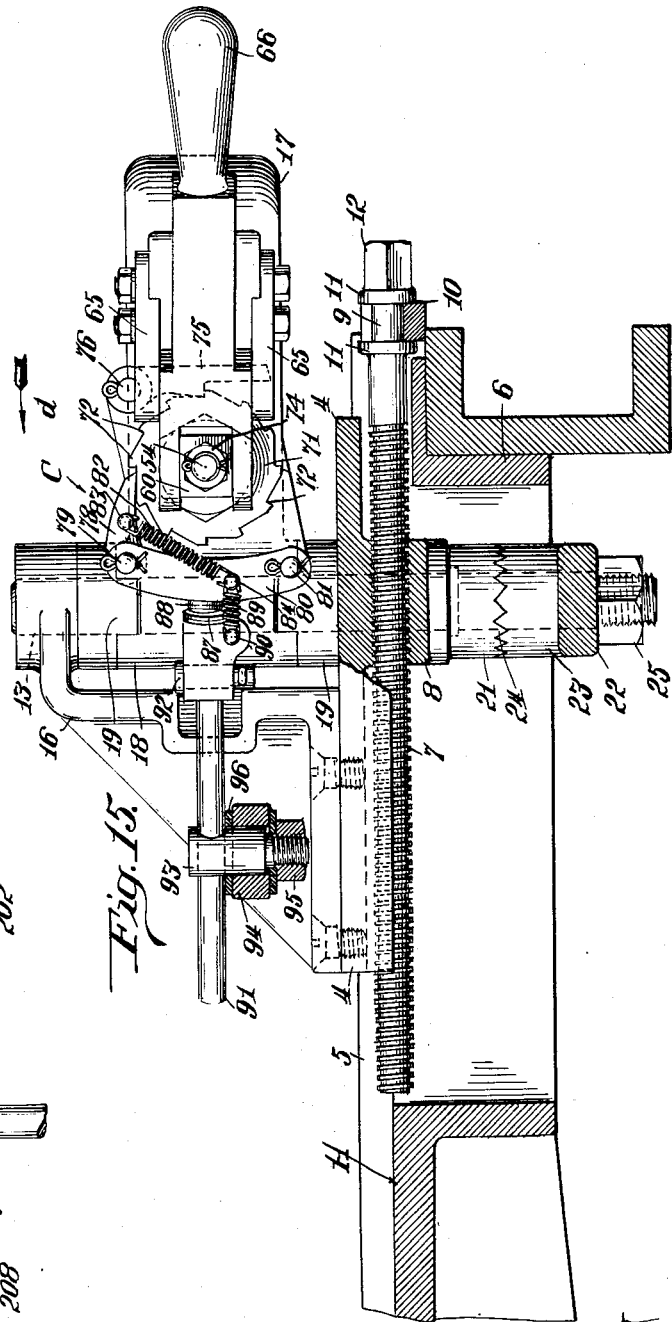

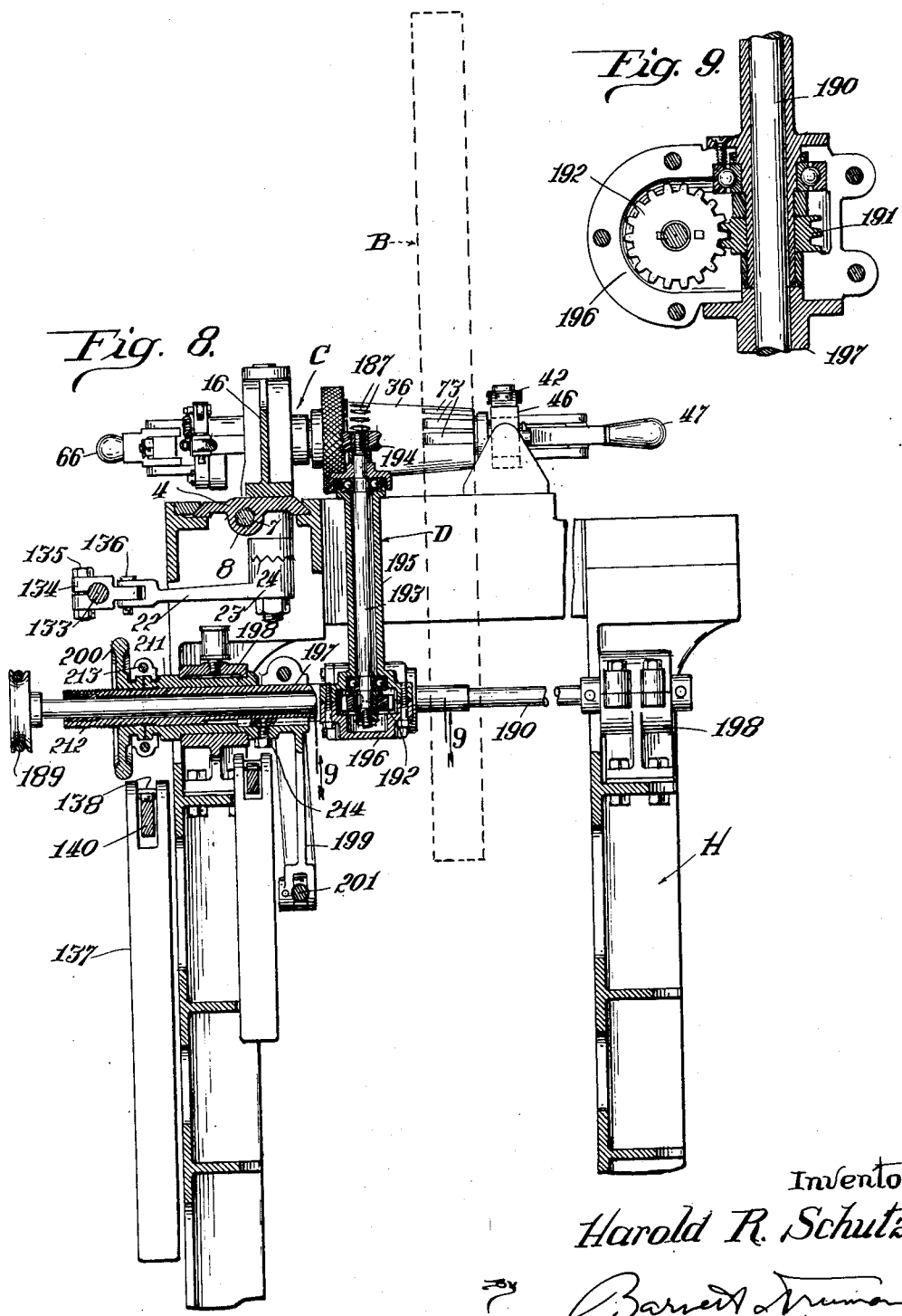

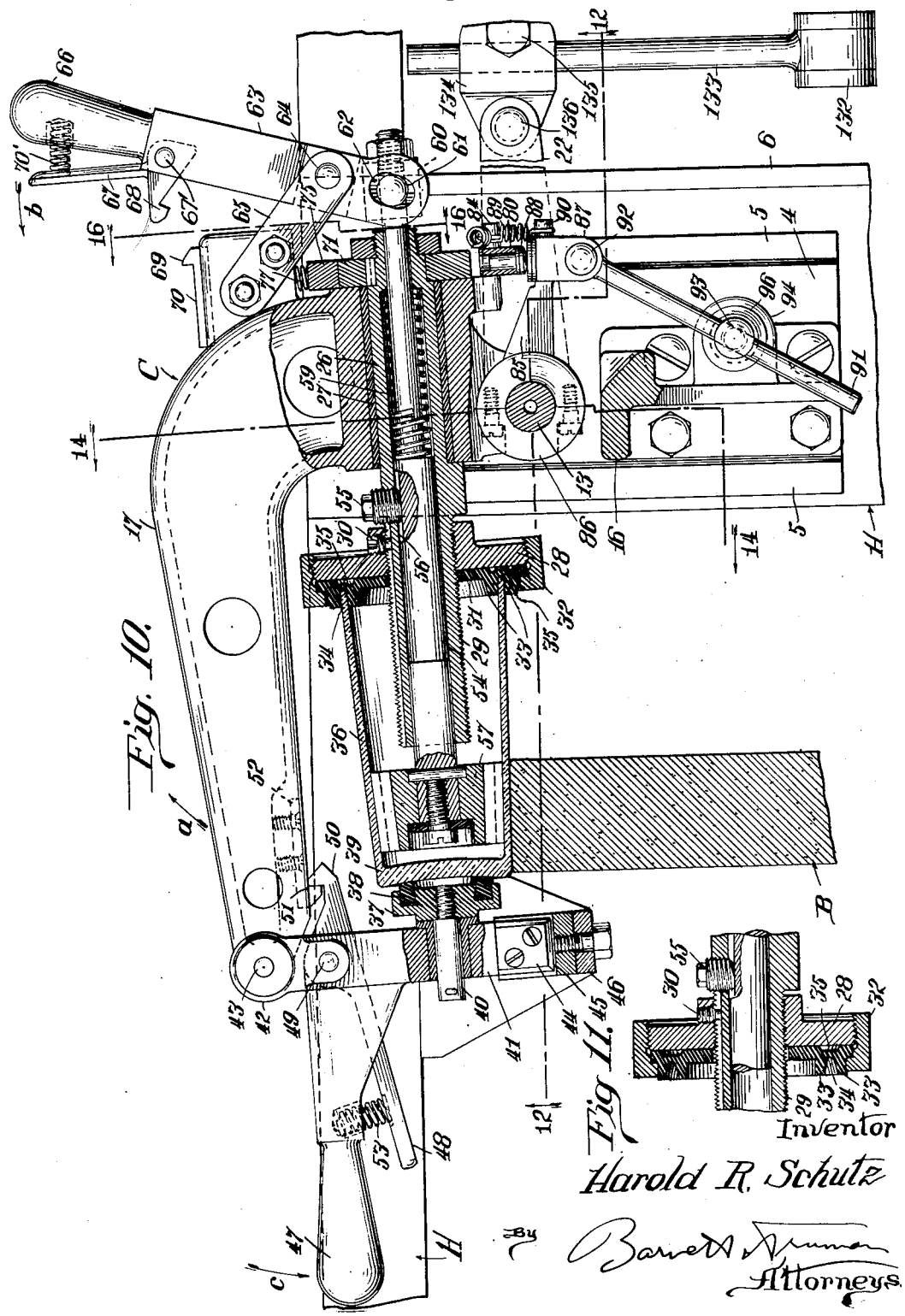

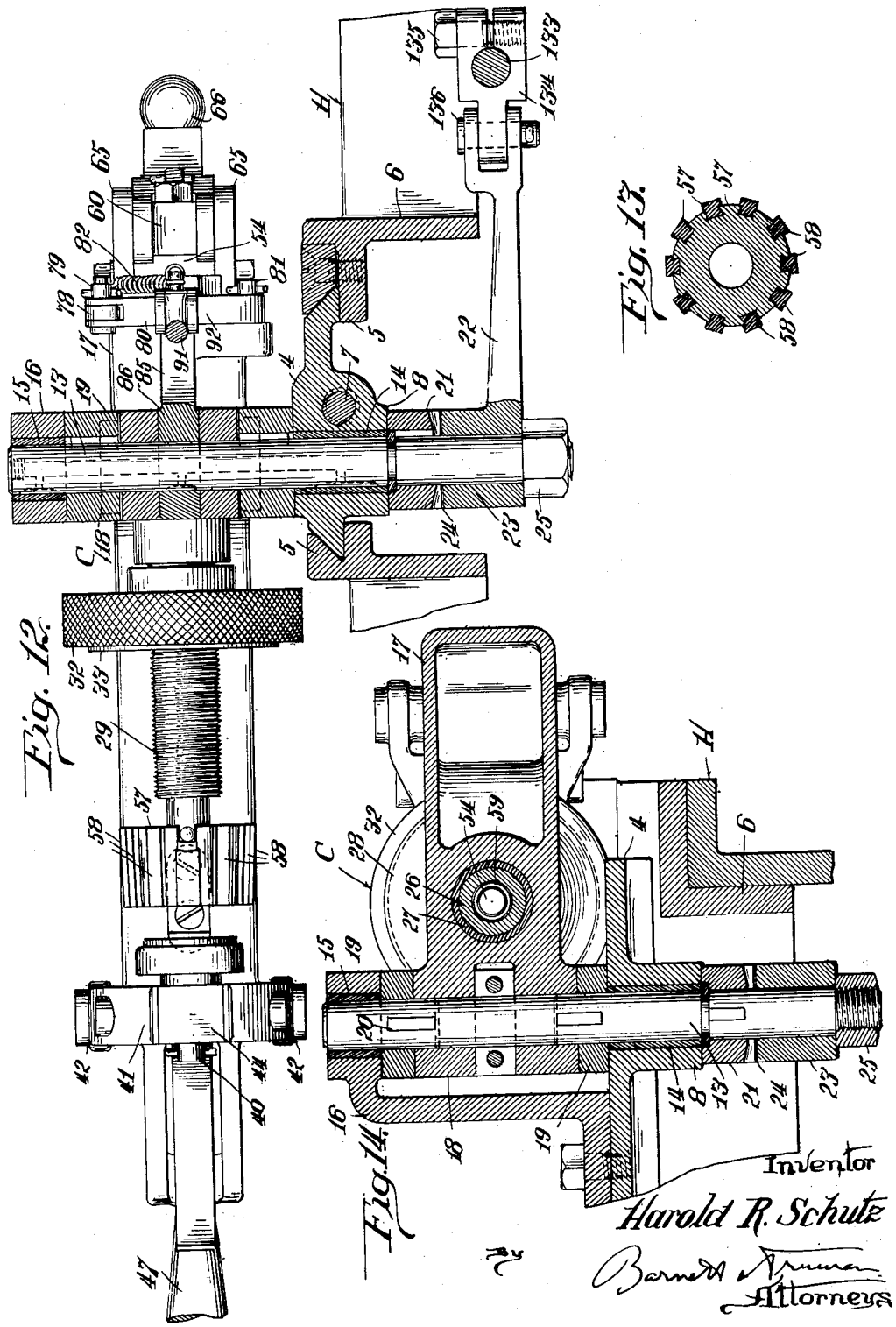

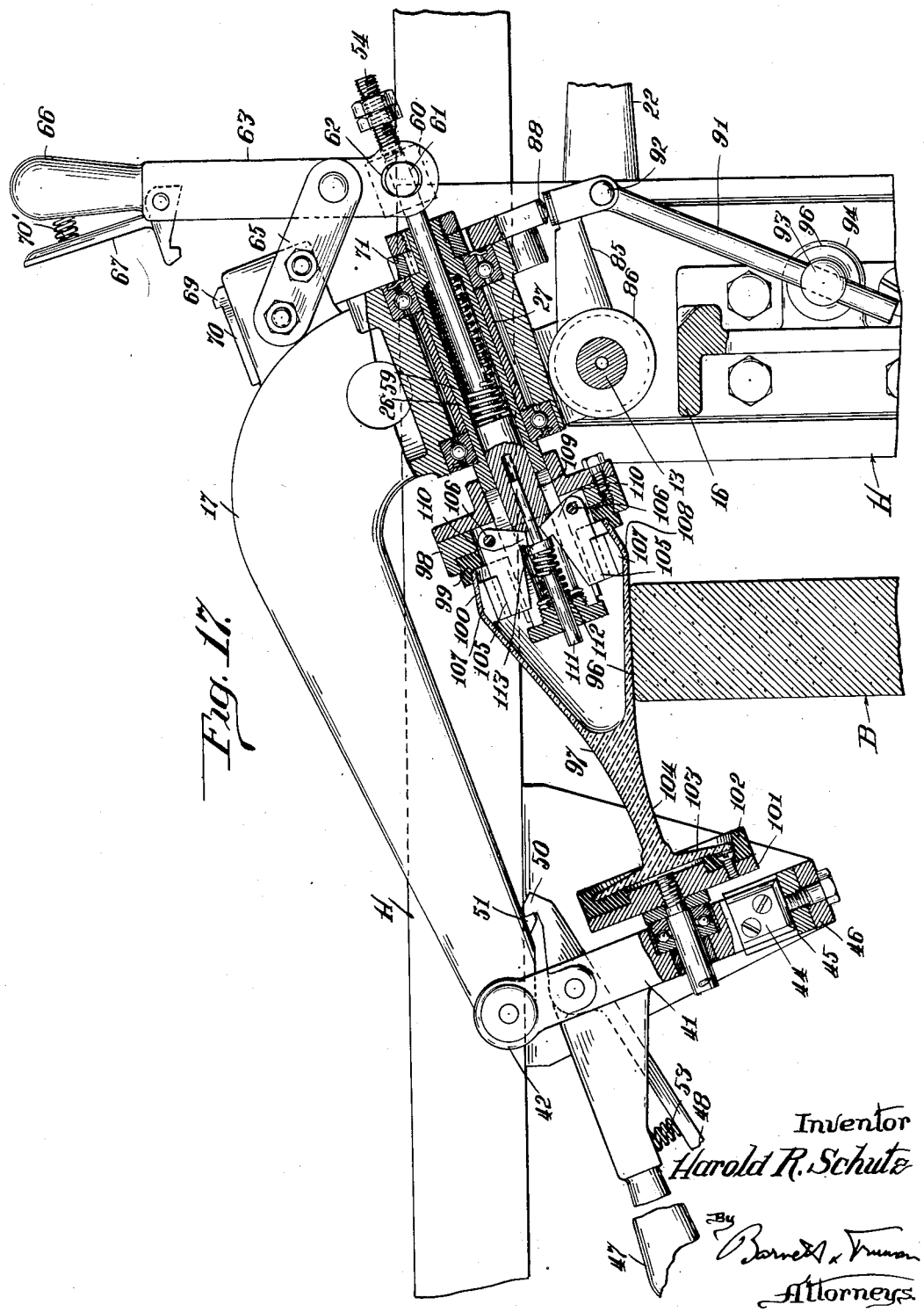

1,947,881

UNITED STATES PATENT OFFICE 1,947,881

TUMBLER FLUTING MACHINE

Harold R. Schutz, Toledo, Ohio, assignor to The Libbey Glass Manufacturing Company, Toledo, Ohio, a corporation of Ohio Application August 8, 1932. Serial No. 627,903

29 Claims. (Cl. 51—107)

This invention relates to a new and improved tumbler fluting machine, more especially a machine adapted to grind fluted surfaces and other ornamental patterns on the exterior surface of glass tumblers or similar hollow glass articles.

The machine may consist of a plurality of similar connected units, each unit comprising a continuously rotating grinding wheel positioned in a vertical plane, and a pair of similar tumbler-holding chucks positioned one at either side of the wheel preferably substantially in the horizontal plane passing through the axis of rotation of the grinding wheel. Automatic means is provided for moving the chuck so as to bring the tumbler or other glass article into and out of engagement with the grinding wheel, and for indexing the tumbler or rotating it step by step through a predetermined small angle while the tumbler is out of engagement with the wheel so as to bring a new surface into position to be ground. A separate continuously rotating grinding device may be positioned adjacent each chuck and mechanism is provided for bringing this decorating device into and out of engagement with the tumbler between successive indexing movements, preferably during the time that a fluted surface is being ground. An automatic hold-out mechanism is provided for holding the chucks away from the grinding wheel for a predetermined period of time after each series of indexing movements has been made and the fluting and decorating operations have been completed, so that the finished article may be withdrawn from the chuck and a new article to be ground positioned within the chuck.

The principal object of this invention is to provide a new and improved fluting and decorating machine for hollow glass articles, of the type briefly described hereinabove and disclosed more in detail in the specifications which follow.

Another object is to provide an improved form of chuck for supporting the tumbler or other hollow glass article during the grinding operation.

Another object is to provide an improved form of chuck for holding stemware.

Another object is to provide an improved indexing mechanism for rotating the tumbler step by step between successive grinding operations.

Another object is to provide an improved hold-out mechanism for holding the tumbler out of engagement with the grinding wheel while it is being removed and replaced by a new tumbler to be ground or decorated.

Another object is to provide an improved decorating mechanism for performing additional grinding operations while the fluted surface is being ground.

Another object is to provide a hold-out means for preventing operation of the decorating mechanism while the tumbler is held out of engagement with the main grinding wheel.

Another object is to provide an improved signal mechanism to give warning to the operator of the machine when the grinding and decorating operations have been completed on any one tumbler and the hold-out mechanism is about to operate to permit changing of the tumbler supported in the chuck.

Another object is to provide means for automatically maintaining a true surface on the grinding wheel.

Other objects and advantages of this invention will be more apparent from the following detailed description of certain approved forms of apparatus constructed and operating according to the principles of this invention.

In the accompanying drawings:

Fig. 1 is an elevation of one end of the machine.

Fig. 2 is a central longitudinal vertical section through the machine, taken substantially on the line 2—2 of Fig. 1.

Fig. 3 is an elevation of the opposite end of the machine from that shown in Fig. 1.

Fig. 4 is a transverse vertical section taken substantially on the line 4—4 of Fig. 2.

Fig. 5 is a transverse vertical section taken substantially on the line 5—5 of Fig. 2.

Fig. 6 is a detail section taken substantially on the line 6—6 of Fig. 4.

Fig. 7 is a detail horizontal section, taken substantially on the line 7—7 of Fig. 4.

Fig. 8 is a vertical section, taken substantially on the line 8—8 of Fig. 3.

Fig. 9 is a detail horizontal section taken substantially on the line 9—9 of Fig. 8.

Fig. 10 is a horizontal section through one of the chuck mechanisms, parts being shown in plan. The view is taken substantially on the line 10—10 of Fig. 1 but looking toward the left as seen in that figure.

Fig. 11 is a detail central section through a portion of the chuck mechanism shown in Fig. 10, but with the tumbler removed.

Fig. 12 is a vertical section taken substantially on the line 12—12 of Fig. 10, with certain parts omitted.

Fig. 13 is a vertical section through the inner chuck block.

Fig. 14 is a vertical section, taken substantially on the line 14—14 of Fig. 10.

Fig. 15 is an end elevation looking from the right at Fig. 10, the lower portion of the figure being shown in vertical section.

Fig. 16 is a detail vertical section taken substantially on the line 16—16 of Fig. 10.

Fig. 17 is a view similar to Fig. 10 showing a modified form of chuck adapted to support stemware.

A single unit machine comprises the main drive shaft A, main grinding wheel B, a pair of similar chuck mechanisms C one positioned at either side of grinding wheel B, a pair of decorating mechanisms D one positioned adjacent each chuck C, an indexing and hold-out mechanism indicated generally at E for controlling both pairs of mechanisms C and D, an adjustable gear train F through which the indexing and hold-out mechanism E is driven from the shaft A, a driving mechanism G for the decorating mechanisms D, and a supporting frame H in which all of the parts are mounted and supported. In case a multiple-unit machine is to be conducted, the main drive shaft A and the other drive shafts as hereinafter described will be continued toward the left as seen in Fig. 2 and a duplicate set or sets of the parts B, C, D and E provided. A single gear train F positioned at one end of the machine will suffice to drive all of the units, and a single driving mechanism G positioned at the other end of the machine drives all of the decorating devices. The supporting frame H will of course be extended as necessary to support the desired number of units. In addition, each unit may be provided with a signalling mechanism indicated generally at J (see Fig. 4) and a mechanism indicated generally at K for truing the grinding wheel B. The machine will be hereinafter described as consisting of a single unit, as illustrated in the accompanying drawings.

The main driving shaft A is supported in suitable bearings 1 in the upper portion of frame H and may be rotated continuously by any suitable means such as a direct connected motor or a belt drive mounted on one projecting end portion of the shaft. The grinding wheel B of usual construction is fixedly but removably mounted on the shaft A so as to rotate continuously in a vertical plane when the shaft is driven. A casing 2 containing a bath 3 of water or other liquid may be positioned about the lower portion of grinding wheel B, and if desired a suitable casing or covering may be provided for the upper portion of the grinding wheel also, except those portions which are necessarily exposed for engagement with the articles to be ground and with the truing mechanism K.

One of the article holding chucks C is positioned at each side of grinding wheel B, preferably so as to be centered substantially in the horizontal plane passing through the axis of rotation of the grinding wheel. These chucks are substantial duplicates of one another and a description of one will suffice for both. The details of this chuck mechanism are best shown in Figs. 10 to 16 inclusive. A supporting plate 4 is mounted in channeled guides 5 formed in a transverse beam 6 of the supporting frame H. An adjusting screw 7 is threaded through a boss 8 projecting downwardly from plate 4, the screw having a portion 9 journalled in a bearing 10 in supporting beam 6. Collars 11 engage the two sides of bearing 10 to prevent longitudinal movement of screw 7. The non-circular projecting end portion 12 of the screw is adapted to be engaged by a suitable wrench so that the screw may be rotated to adjust the supporting plate 4 transversely of the machine in the guides 5. The assembled chuck mechanism is carried by plate 4 so that the entire chuck assembly may be adjusted transversely of the machine by means of screw 7.

A vertical shaft 13 is journaled near its lower end in a bearing 14 carried by plate 4, and is journaled at its upper end in a bearing 15 carried by a bracket 16 mounted on the plate 4. The main bracket or casting 17 of the swinging chuck mechanism has an ear 18 journaled on shaft 13 and interlocking with the annular spacing blocks 19 which are keyed at 20 on shaft 13 so that the bracket 17 is fixed to and swings with the shaft 13. An annular block 21 is keyed on shaft 13 beneath the supporting plate 4, and an operating crank arm 22 has a hub 23 journaled on shaft 13 beneath the block 21. The adjacent end portions of the block 21 and hub 23 are formed with interlocking clutch teeth 24, and the hub 23 is adapted to be held in locked engagement with block 21 by means of nut 25 threaded on the lower reduced end portion shaft 13. It will be apparent that by removing the nut 25 the angular relation of crank arm 22 with shaft 13 may be adjusted as desired. Operating means, hereinafter described, is connected with crank arm 22 so as to swing shaft 13 at predetermined times and thus move the chuck assembly and the tumbler carried thereby into and out of engagement with the grinding wheel.

A hollow or tubular shaft 26 is rotatably journaled in bushing 27 carried by bracket 17. The disk 28 of the head-rest of the chuck is adjustably screwed on the threaded portion 29 of shaft 26 and held in adjusted position by locking screw 30, the head-rest being adjusted longitudinally of shaft 26 in accordance with the length of the tumbler or other glass article to be operated upon. An annular plate or disk 31 of rubber or other suitable yielding material is secured on the inner face of disk 28 by means of locking ring 32 threaded on the periphery of disk 28. The rubber disk 31 is formed with a pair of annular lips 33 centered about the axis of rotation of shaft 26. An annular groove 34 with normally diverging side walls (see Fig. 11) is formed between the lips 33, and an annular space 35 is formed in the back of disk 31 behind the clamping jaws or lips 33. When the open upper edge portion of the tumbler 36 (see Fig. 10) is pushed into the groove 34 the disk will give rearwardly into annular space 35 so as to cause the lips 33 to clamp against the inner and outer surfaces of the edge portion of the tumbler.

A bottom chuck-block 37 carries a rubber ring 38 adapted to be clamped against the bottom 39 of tumbler 36. Chuck-block 37 is carried by stem 40 rotatably mounted in supporting lever 41 having ears 42 journaled at 43 on the free end portion of bracket 17. The other end 44 of lever 41 engages in a slot or recess 45 formed in the steadying bracket 46 mounted on supporting frame H. By means of handle 47 formed on lever 41 the bottom chuck member 37 may be swung into and out of engagement with the bottom 39 of tumbler 36. A latch-lever 48 pivoted at 49 has a hooked end 50 adapted to engage a fixed detent 51 formed on bracket 17 or on a plate 52 secured to the bracket. A spring 53 confined between latch-lever 48 and handle 47 automatically moves the latch to locking position. In an obvious manner the latch may be unlocked by pressing lever 48 against the handle 47 after which the lever 41 may be swung about pivot 43 so as to remove the lower chuck block from engagement with the tumbler. The latch will automatically lock when the chuck member is swung back to the position shown in Fig. 10.

An inner shaft or push-rod 54 is longitudinally slidable within hollow shaft 26, being held against rotation within shaft 26 by screw 55 mounted in shaft 26 and projecting into slot 56 formed in the push rod. An inner chuck block 57 mounted on push rod 54 is provided with an annular series of rubber inserts 58, the outer surfaces of which are tapered so as to substantially fit the tapered inner surface of tumbler 36. A spring 59 confined within shaft 26 about a reduced portion of the push rod 54 tends to automatically urge the push rod inwardly so as to force the inner chuck 57 into engagement with the inner surface of tumbler 36. A block 60 rotatably mounted on the outer end of push rod 54 is provided with projecting pins 61 which engage in slots 62 formed in one forked end of lever 63 intermediately pivoted at 64 between bracket arms 65 mounted on the main bracket 17. An operating handle 66 is formed on the outer end of lever 63, and a latch-lever 67 pivoted at 67' in lever 63 carries a hooked detent 68 adapted to engage with fixed detent or projection 69 carried by portion 70 of bracket 17. Spring 70' tends to automatically swing latch-lever 66 to locking position.

With the parts in the positions shown in Fig. 10, the tumbler 36 will be held between the head-rest 28 and the bottom chuck 37, and the inner chuck 57 will be forced by spring 59 into engagement with the inner surface of tumbler 36 so as to properly center the tumbler about the axis of rotation of shaft 26 and securely hold the tumbler in this position. When tumbler 36 has been completely fluted or decorated and is to be removed and a new tumbler inserted in the chuck, the bracket assembly will be automatically swung in the direction of arrow $a$ (Fig. 10) by mechanism hereinafter described so as to bring the tumbler out of engagement with grinding wheel B and will be automatically held out in this position for a period of time sufficient to permit the changing of the tumblers. The operator first swings the handle 66 in the direction of the arrow $b$ so as to withdraw the inner chuck 57 from engagement with the inner surface of the tumbler, the latch 68 automatically engaging with fixed detent 69 so as to hold the inner chuck in this withdrawn position. The operator then grasps handle 47 and latch-lever 48 so as to unlock the detent 50 and swing the bottom chuck 37 away from the lower end of tumbler 36. The finished tumbler may then be withdrawn and another tumbler pushed in position until it is loosely supported over inner chuck 57 with its upper edge in engagement with the annular slot 34 in rubber disk 31 of the head-rest 28. Handle 47 is then swung back in the direction of the arrow $c$ until latch 50 automatically engages with fixed detent 51. The bottom chuck 37 will thus be pressed into engagement with the bottom of tumbler 36 so as to force the upper edge of the tumbler into firm engagement with rubber disk 31, the lips 33 clamping about the upper edge of the tumbler. The latch lever 67 is then compressed against handle 66 so as to release the locking detent 68, whereupon spring 59 will automatically move the inner chuck 57 into engagement with the inner surface of tumbler 36.

That portion of the indexing mechanism carried by the chuck assembly comprises a ratchet wheel 71 keyed on the outer end of shaft 26 and provided with a number of ratchet teeth 72 corresponding to the number of fluted surfaces or facets 73 (see Fig. 8) to be ground on tumbler 36. By removing the holding nut 74, ratchet wheel 71 may be withdrawn or replaced by a ratchet having a different number of teeth. A locking pawl 75 pivoted at 76 on supporting bracket 17 is yieldably urged by spring 77 into engagement with the teeth of ratchet wheel 71. The operating pawl 78 is pivoted at 79 on pawl-lever 80 pivoted at 81 on the bracket 17. A spring 82 secured at one end to pin 83 on pawl 78 and at the other end to pin 84 on lever 80 yieldably holds the pawl 78 in engagement with the ratchet wheel 71. The stop-lever 85 has the hub 86 at its inner end pivotally mounted on vertical shaft 13 and carries at its outer end a stop block 87 adapted to engage the stop-button 88 mounted in pawl-lever 80. Spring 89 secured at one end to pin 84 on lever 80 and at its other end to pin 90 on stop-block 87 normally holds button 88 in engagement with block 87. The adjusting rod 91 is pivotally connected at one end 92 with stop block 87, the rod being slidable through a cylindrical stud 93 projecting downwardly through ear 94 formed on bracket 16. By means of nut 95 threaded on the reduced lower end portion of stud 93, the stud may be drawn downwardly so as to clamp the rod 91 against the washer 96 interposed between the rod and ear 94 and thus lock the rod in fixed position. By loosening the nut 95 the position of stop-block 87 may be adjusted by swinging the lever arm 85 about the vertical shaft 13. When nut 95 is tightened, the stop-block 87 is fixed immovably in position.

When the crank arm 22 is oscillated in the proper direction (by mechanism hereinafter described) the bracket arm 17 and the chuck assembly carried thereby will be swung out in the direction of the arrow $a$ in Fig. 10 so as to move the tumbler out of engagement with grinding wheel B. At the same time the rear or outer end of the bracket 17 will be swung in the direction of the arrow $d$ (Fig. 15). Since the stop-block 87 is fixed and does not participate in this swinging movement the pawl lever 80 which is moved toward stop 87 will be swung toward the right (Fig. 15) so as to cause operating pawl 78 to rotate the ratchet wheel 71 through an angular distance corresponding to the length of one tooth 72. Locking pawl 75 will hold the ratchet against retrograde movement. This movement of ratchet wheel 71 will correspondingly rotate the shaft 26 and the chuck members 28, 57 and 37 so as to rotate the tumbler 36 through a sufficient angular distance to present a new face to be ground to the grinding wheel B. This step by step rotation of the tumbler will be repeated each time the chuck mechanism is automatically swung out of engagement with the grinding wheel B.

It will be apparent that the outer face of tumbler 36, or other article to be ground, should be positioned substantially parallel to the grinding surface of wheel B when the tumbler is moved to grinding position against the wheel. In order to properly position the article the supporting plate 4 is adjusted transversely of the machine to such a position that when the bracket 17 is swung in toward the wheel B the outer surface of tumbler 36 will be presented in the proper parallel relation to the wheel. By loosening the nut 95 the stop-block 87 may then be adjusted into proper relation to this annular position of bracket 17. As already described, the angular position of crank arm 22 on shaft 13 is adjustable, and the mechanism which operates crank arm 22 is also adjustable so that the indexing mechanism will function properly no matter what the normal operating position of chuck bracket 17 is with respect to the supporting frame and grinding wheel.

At this point reference will be made to the modified form of chuck mechanism disclosed in Fig. 17, particularly adapted for supporting stemware. Parts of this chuck mechanism not here described will be understood to be substantially the same as those of the first form of the apparatus as described in detail hereinabove. Since the surface 96 on the bowl of the goblet 97 is positioned at a considerably greater angle to the central axis of the glass article than was the case with the outer surface of tumbler 36 as previously described, the chuck mechanism must be normally positioned at a much greater angle with respect to the frame and grinding wheel, as clearly shown in Fig. 17. The mechanisms by which this adjustment is made have been already described. The headrest 98 is provided with an annular rubber ring 99 adapted to yieldably engage about the inturned upper edge portion 100 of the goblet. The bottom chuck member 101 carries a yieldable ring 102 adapted to engage the circular base 103 formed at the lower end of stem 104 of the goblet. A circular series of lever arms 105, each pivotally mounted at 106 in head 98 and each provided with a yieldable insert 107 adapted to engage within the outwardly bowed portion 108 of the bowl of the goblet, are normally held in this outward position by push-rod 109 (corresponding to push-rod 54 previously described) which engages the inwardly extending arms 110 of the levers. The push-rod is normally urged inwardly by spring 59 as in the first described form of the apparatus. When the push-rod is withdrawn by operating handle 66, the levers are all swung inwardly by means of a plunger 111 operated by spring 112 and having a collar 113 engaging the inner arms 110 of the levers. It will be obvious that by suitably varying the forms of the chuck devices, stemware of various sizes and contours may be supported in a similar manner.

Referring now more particularly to Figs. 1, 2, 4 and 6, the gear train F comprises a gear 114 keyed on main driving shaft A, and a plurality of successively meshing gears 115, 116, 117, 118, 119, 120 and 121, the last named gear being keyed on counter-shaft 122 of the change-speed gear box 123 of well known type. This gear box comprises a gear 124 which may be moved into engagement with any one of a series of gears indicated at 125 whereby the speed transmitted to shaft 126 may be varied. The shaft 126 is coupled at 127 to the shaft 128 on which is mounted the indexing cam 129 (Fig. 4). A pair of similar operating bellcranks 130 are provided, one for each of the chuck mechanisms C, each pivoted at 131 in one side of the frame H. An upper arm 132 of the bellcrank is pivoted to one end of a link 133 which is adjustably connected at 134 (see Fig. 10) with the outer end of operating crank 22. As shown in Figs. 10 and 12, the block 134 is adjustably clamped by bolt 135 on link 133 and is pivotally connected at 136 with the outer end of crank 22. An operating weight 137 is suspended by pin 138 resting in one of the notches 139 formed in the outwardly projecting arm 140 of bellcrank 130. The third, downwardly projecting arm 141 of the bellcrank is provided with a cam-roller 142 positioned to be engaged by the indexing cam 129. The weight 137 will normally swing the bellcrank 130 so as to move the chuck mechanism C and carry the tumbler or other glass article into grinding engagement with the wheel B. The weight 137 will yieldably hold the glass article in engagement with the wheel and move it toward the wheel as the glass surface is ground away. When the slowly rotating indexing cam 129 moves into engagement with roller 142, the bellcrank 130 will be swung to the position shown at the right of Fig. 4 so as to lift the weight 137 and swing the chuck C and tumbler 36 away from the grinding wheel B. At this time the glass article will automatically be indexed or advanced through one angular step so as to present a new surface to the grinding wheel, by means of the indexing mechanism previously described. As soon as cam 129 has passed out of engagement with roller 142, the weight 137 will automatically swing the tumbler back into engagement with the grinding wheel. The gear train is so adjusted that cam 129 will make one complete rotation in the time necessary to grind one fluted surface on the tumbler. It will be noted that the same indexing cam 129 operates one of the chuck mechanisms at the end of each 180° of rotative movement so that the tumblers will be swung out of engagement with the grinding wheel alternately.

The indexing cam 129 only remains momentarily in engagement with the roller 142 so that the chuck bracket is only swung away from the grinding wheel long enough to permit the indexing of the tumbler or other glass article, after which it is returned almost immediately into engagement with the grinding wheel. It will be apparent that this time interval is not sufficient to permit the changing of tumblers in the chuck, after one tumbler has been completely fluted. For this reason an automatic hold-out mechanism is provided whereby the chuck will be held away from the grinding wheel periodically for a longer time to permit the changing of the tumblers. A shaft 143 positioned below and parallel to the shaft 128 is driven at a much slower speed than shaft 128 through a train of gearing comprising the gear 144 keyed on shaft 122, the planetary reducing gearing indicated generally at 145, sleeve 146, and intermeshing gears 147 and 148. Gear 149 keyed on shaft 143 drives gear 150 rotatably journaled on shaft 128 adjacent the indexing cam 129. The hold-out cam 151 is mounted on gear 150. The gear trains are so adjusted that if $n$ equals the number of fluted surfaces ground in one complete circular series on the tumbler, the indexing cam 129 will make $n+1$ rotations while the hold-out cam 151 is making one rotation. A pair of similar hold-out assemblies are positioned one at each side of the machine so as to co-operate with one of the levers 141 and with the hold-out cam 151. Each of these assemblies comprises a small bellcrank lever 152 pivoted in the frame at 153 and carrying a roller 154 at the end of its longer arm in position to be engaged by the hold-out cam 151. The shorter, substantially vertically projecting arm 155 of the bellcrank is pivotally connected to one end of the rod 156, the opposite end of which is reduced and threaded at 157. A long nut 158 having an outstanding collar 159 is threaded on the reduced portion 157 of the rod and secured in adjusted position by locking nut 160. The nut 158 is slidable through an opening in the outer wall of frame H. A compression spring 161 is confined between the inner wall of the frame and a collar or washer 162 mounted on rod 156. When the roller 154 is not engaged by the hold-out cam 151, the spring 161 will expand so as to push rod 156 inwardly until the stop collar 159 engages the outer wall of the frame, as shown at the left of Fig. 4. When hold-out cam 151 engages the roller 154 it will swing the bellcrank 152 about its pivot 153 and push the rod 156 outwardly so as to compress spring 161, all as shown at the right of Fig. 4. A small latch lever 163 is pivoted intermediate its ends on pin 153, and a spring 164 confined between one arm of this lever and a portion of the bellcrank normally holds the latch-lever and bellcrank in the relative positions shown at the left of Fig. 4. The hooked end 165 of the latch is adapted to engage the stud 166 projecting outwardly from the pivot pin of roller 142. (See Fig. 6.)

The normal position of this latch assembly is as shown at the left of Fig. 4. Each time the indexing cam 129 completes a rotation and engages the roller 142, it will push this roller outwardly to swing the tumbler away from the grinding wheel and effect an indexing operation, but the pin or stud 166 will swing past the latch 165 without becoming engaged therewith. Moreover, each time the hold-out cam 151 completes a rotation, it engages the cam roller 154 and swings the hold-out assembly to the position shown at the right of Fig. 4. While the assembly is in this position, the indexing cam 129 engages roller 142 and swings the lever 141 outwardly. The pin or stud 166 will now engage the beveled outer face of latch 165 and swing this latch-lever against the resistance of spring 164 so that the latch will swing back over the pin 166 as indicated at the left of Fig. 4. The indexing cam 129 will move away from roller 142 before the hold-out cam 151 moves out of engagement with roller 154. The lever 141 will then tend to swing inwardly, under the influence of weight 137, so as to move pin 166 into engagement with the inwardly hooked portion 167 of the latch member. When the hold-out cam 151 now passes out of engagement with roller 154, the latch 165 will remain in hooked engagement with pin 166 and the chuck assembly will be held out away from the grinding wheel, the operating members remaining substantially in the position shown at the right of Fig. 4. The parts will remain in this position until the indexing cam 129 has made one complete rotation, whereupon it will engage cam roller 142 and swing the lever 141 outwardly a distance sufficient to release pin 166 from the hooked end 167 of latch 165, whereupon spring 161 will expand and swing the hold-out assembly to the inoperative position as shown at the left of Fig. 4. As soon as indexing cam 129 has moved out of engagement with roller 142, the weight 137 will swing the chuck assembly inwardly so that another grinding operation will begin.

It will be noted that these hold-out assemblies are positioned 180° apart about the axis of rotation of hold-out cam 151, so that the grinding cycle for one tumbler will be one-half completed at the time the other tumbler has been completed and a new tumbler is being inserted. In this manner a single operator will have adequate time to move from one side of the machine to the other to change the tumblers in both chuck mechanisms.

A signal mechanism J is provided to give warning to the operator when one fluting operation is about completed and it is time to withdraw the finished tumbler and insert a new one. In the form here shown, a signal lamp 168 is positioned adjacent each of the chuck assemblies. A lever 169 is pivoted in the frame at 170 in such position that it will be engaged by hold-out cam 151 a short time before it engages the roller 154 of the hold-out latch mechanism. Lever 169 operates a push rod or link 171 which moves switch contact 172 into engagement with a relatively fixed contact 173 so as to complete the circuit for the respective signal lamp 168. It will be obvious that the lamp 168, adjacent one or the other of the chucks, will light a short time before the hold-out mechanism is to operate that chuck, so that the operator may be in position to change the tumblers.

A mechanism K is provided for automatically maintaining a true grinding surface on the wheel B. A longitudinally reciprocable shaft 174 is mounted in guides 175 carried by a frame 176 supported from frame H (see Figs. 1 and 2). A block 177 of carborundum or some other suitable grinding material is carried by a weighted lever 178 which is pivoted on shaft 174 so that the grinding block 177 may be swung down into engagement with the upper surface of grinding wheel B, or may be swung up to the inoperative position suggested in dotted lines in Fig. 1. A bellcrank pivoted at 179 on a bracket 180 extending from frame 176 has the forked upper end of one arm 181 engaged with pins 182 on shaft 174, and the other arm 183 is pivotally connected with the upper end of a link 184 the lower end of which is pivoted on pin 185 eccentrically mounted on disk 186 which is connected to rotate with one of the intermediate gears 119 of the gear train F. It will be apparent that the eccentric pin 185 will reciprocate the link 184, and through the bellcrank 183 and 181 the shaft 174 will be reciprocated so as to move the truing block 177 back and forth across the upper face of the rotating grinding wheel B. The reciprocating mechanism operates continuously, but the truing mechanism may be thrown temporarily out of operation by simply swinging lever 178 upwardly about its pivotal connection with shaft 174.

In addition to fluting the tumbler, as already described, it is often desirable to additionally decorate the tumbler by grinding certain patterns in the outer surface thereof as indicated at 187 in Fig. 8. For this purpose the automatic decorating mechanisms D are provided, and these mechanisms, together with the driving mechanism G therefor, will now be described referring more particularly to Figs. 2, 3, 5, 7, 8 and 9. The driving mechanism G comprises a motor 188 (which may rotate continuously when the machine is in operation), conveniently positioned at one end of the machine as shown in Fig. 3, and connected by belt gearing 189 with a pair of horizontal drive shafts 190, one of which is journaled in the frame adjacent each side thereof and beneath one of the chuck mechanisms C. A skew gear 191 keyed on shaft 190 meshes with a similar gear 192 keyed on the lower end of a substantially vertical shaft 193 which carries at its upper end the grinding tool 194 which has its periphery so designed as to make the desired cuts 187 in the tumbler 36. The shaft 193 is journaled in suitable bearings in a casing 195 which is an extension of gear casing 196 mounted at one end of sleeve 197 in which the shaft 190 is journaled. The sleeve 197 is longitudinally adjustable through a sleeve 211 which is mounted for oscillation in a bearing 198 in the machine-frame but which is held from longitudinal movement by outstanding collars engaging the respective ends of this bearing. A hand-wheel 200 is threaded on the outer end portion of sleeve 197 at 212, and a collar 213 engages in annular grooves in the adjacent end of sleeve 211 and hub of wheel 200 to permit rotary movement of the hand-wheel while holding the wheel against longitudinal movement. Rotation of the hand-wheel will cause the sleeve 197, and the decorating-tool 194 carried thereby, to be moved longitudinally of shaft 190 to vary the position of the decoration cut on tumbler 36, or to accommodate different lengths of glassware. The sleeve 197 is automatically oscillated to swing the tool 194 into and out of engagement with tumbler 36 by means of crank arm 199 secured to sleeve 211 which is keyed at 214 to sleeve 197. The crank arm 199 is connected through link 201 (Fig. 5) with the downwardly extending arm 202 of a bellcrank assembly pivoted at 203 and having the substantially horizontal arm 204 adjustably carrying the weight 205 which is suspended in one of a series of notches 206 in crank arm 204. The weight 205 normally tends to swing the bellcrank mechanism so as to cause the grinding tool 194 of mechanism D to be moved into engagement with the glass tumbler. The decorating cam 207 is keyed on shaft 128 adjacent the indexing cam 129 and is adapted to engage the rollers 208 mounted in the lower ends of the two crank arms 202. The high portion of cam 207 which extends throughout the greater portion of its periphery is adapted to hold the roller 208 outwardly in the position shown at the left of Fig. 5, with the weight 205 elevated and the tool 194 moved out of engagement with the glass tumbler. When the low portion 209 of cam 207 comes opposite one of the rollers 208, this roller is permitted to swing inwardly thereby permitting weight 205 to move the decorating tool 194 into grinding engagement with the tumbler 36. Ordinarily, considerably less time is required to grind the decorating cuts 187 than is required to grind one of the fluted surfaces 73. The low portion 209 of cam 207 is so positioned that the decorating tool will be held out of engagement with the tumbler until after grinding wheel B has started to grind one of the fluted surfaces 73, and the tool 194 will be withdrawn from engagement with the tumbler before this fluting operation has been completed. In this manner the decorating mechanisms D will continue to operate automatically whenever a tumbler 36 is in condition to be ground and has been properly indexed.

It is also desirable that the decorating mechanisms D be held back, or in inoperative position, during the time interval that the hold-out mechanism hereinabove described is operating to permit changing of the tumblers in the chucks C. It will be noted that the decorating levers 202 swing adjacent to the indexing levers 141. Stop arms 210 are secured to the respective levers 202 adjacent their free ends, these arms projecting laterally so as to engage behind the adjacent indexing levers 141. It will be apparent that when the indexing levers are held out by the latches 165, as already described, the stop arms 210 engaging behind the indexing levers 141 will prevent the respective decorating levers 202 moving inwardly even though the low part 209 of cam 207 comes under one of the rollers 208. In this manner each decorating mechanism D is prevented from swinging inwardly to operative position unless the respective chuck assembly C has been previously moved into its proper operative position.

The main grinding wheel B is mounted on a sleeve 215 (see Figs. 2 and 5) which is split at each end and provided with a tapered thread 216 on which are threaded the clamping nuts 217. The central portion of the sleeve 215 is provided with a threaded portion on which wheel B is secured by means of nuts 218 and clamping washers 219. By loosening the clamping nuts 217 the sleeve 215 and wheel B may be adjusted longitudinally of shaft A to bring the grinding stone into proper relationship with the surface of the tumbler. When the nuts 217 are screwed inwardly on the tapered threads 216, the split ends of the sleeve will be clamped on shaft A, thus securing the grinding wheel to the shaft in the adjusted position. In this manner tumblers of different lengths may be fluted, or the fluted portion may be ground at different positions on the tumbler.

It will now be apparent that the operation of both the fluting and decorating mechanisms is entirely automatic, once the machine has been properly adjusted and set in operation. After the grinding and decorating of each tumbler has been completed, the respective chuck C is automatically held out of engagement with grinding wheel B, and the decorating tool is held in inoperative position for a period of time sufficient to permit the operator to withdraw the finished tumbler and insert a new one. A signal is provided whereby the operator will know when to prepare for this tumbler changing operation. In case the machine is extended in the form of a plurality of similar grinding and decorating units, as hereinabove suggested, the "hold-out times" of each of the several chuck mechanisms C may be so staggered by properly adjusting the position of the cams on shaft 128, that no two chuck mechanisms C will be held out at the same time and a single operator can perform the tumbler-changing operation for a plurality of units.

I claim:

1. In a fluting machine, a chuck for holding the hollow glass article to be fluted, said chuck comprising a supporting bracket, a head chuck member and a bottom chuck member adapted to engage the top and bottom of the article respectively, means for supporting the chuck members rotatably on the bracket, one of the chuck members being movable to permit the insertion and removal of the glass article, an inner chuck member adapted to engage the interior of the article, and means operable from outside the article for moving the inner chuck.

2. In a fluting machine, a chuck for holding the hollow glass article to be fluted, said chuck comprising a supporting bracket, a head chuck member and a bottom chuck member adapted to engage the top and bottom of the article respectively, means for supporting the chuck members rotatably on the bracket, one of the chuck members being movable to permit the insertion and removal of the glass article, an inner chuck member adapted to engage the interior of the article, means for normally moving the inner chuck member to article-engaging position, and means operable from outside the article for disengaging the inner chuck member.

3. In a fluting machine, a chuck for holding the hollow glass article to be fluted, said chuck comprising a supporting bracket, a head chuck member and a bottom chuck member adapted to engage the top and bottom of the article respectively, means for supporting the chuck members rotatably on the bracket, one of the chuck members being movable to permit the insertion and removal of the glass article, an inner chuck member adapted to expand into engagement with the interior of the article, means for normally expanding the inner chuck member, and means operable from outside the article for retracting the inner chuck member out of engagement with the article.

4. In a fluting machine, a chuck for holding the hollow glass article to be fluted, said chuck comprising a supporting bracket, a head chuck member rotatably supported in the bracket and adapted to engage the top of the article, a bottom chuck member, means for rotatably supporting the bottom chuck and for moving same into or out of engagement with the bottom of the article, an inner chuck member adapted to engage the interior of the article, and means operable from outside the article for moving the inner chuck.

5. In a fluting machine, a chuck for holding the hollow glass article to be fluted, said chuck comprising a supporting bracket, a head chuck member rotatably supported in the bracket and adapted to engage the top of the article, a bottom chuck member, means for rotatably supporting the bottom chuck and for moving same into or out of engagement with the bottom of the article, an inner chuck member adapted to engage the interior of the article, means for normally moving the inner chuck member to article-engaging position, and means operable from outside the article for disengaging the inner chuck member.

6. In a fluting machine, a chuck for holding the hollow glass article to be fluted, said chuck comprising a supporting bracket, a head chuck member rotatably supported in the bracket and adapted to engage the top of the article, a bottom chuck member, means for rotatably supporting the bottom chuck and for moving same into or out of engagement with the bottom of the article, an inner chuck member adapted to expand into engagement with the interior of the article, means for normally expanding the inner chuck member, and means operable from outside the article for retracting the inner chuck member out of engagement with the article.

7. In a fluting machine, a chuck for holding the hollow glass article to be fluted, said chuck comprising a supporting bracket, a shaft mounted in the bracket, a head-rest adjustably mounted on the shaft for yieldably engaging the upper open end portion of the article, a yieldable clamping member on the head-rest, said clamping member comprising concentric annular clamping lips the adjacent inner faces of which diverge to form a groove for receiving the upper edge portion of the glass article, the clamping member yielding inwardly when the article is forced to position to cause the lips to move toward one another and clamp the article, a clamping block for engaging the closed lower end portion of the article, a supporting member movably mounted on the bracket, means for rotatably holding the clamping block in the supporting member, and a latch for holding the supporting member in position to hold the clamping block in engagement with the hollow article.

8. In a fluting machine, a chuck for holding the hollow glass article to be fluted, said chuck comprising a supporting bracket, a hollow shaft rotatably mounted in the bracket, a head-rest mounted on the shaft, means on the head-rest for yieldably engaging the annular open upper end of the hollow article, a clamping block for engaging the closed lower end of the article, a supporting member movably mounted on the bracket, means for rotatably holding the clamping block in the supporting member, a latch for holding the supporting member in position to hold the clamping block in engagement with the hollow article, an annular series of radially movable chuck members supported by the hollow shaft and movable into engagement with the inner surface of the glass article, means for normally retracting the members, a push-rod longitudinally slidable in the hollow shaft and adapted to engage the movable chuck members, a spring for urging the push-rod inwardly to move the chuck members outwardly to clamping position, and means engaging with the outer portion of the push-rod to temporarily hold the rod in withdrawn position and permit the chuck members to be moved out of engagement with the article.

9. In a fluting machine, a chuck for holding the hollow glass article to be fluted, said chuck comprising a supporting bracket, a hollow shaft rotatably mounted in the bracket, a head-rest mounted on the shaft, means on the headrest for yieldably engaging the annular open upper end of the hollow article, a clamping block for engaging the closed lower end of the article, a supporting member movably mounted on the bracket, means for rotatably holding the clamping block in the supporting member, a latch for holding the supporting member in position to hold the clamping block in engagement with the hollow article, an annular series of bellcranks pivotally carried by the hollow shaft and each comprising a substantially radial arm and an arm extending substantially parallel to the shaft, a chuck block carried by each of the last mentioned arms and movable into engagement with the inner surface of the hollow article, spring actuated means engaging the inner arms for swinging the chuck-carrying arms inwardly away from the article, a push-rod longitudinally slidable in the hollow shaft, the inner end of the push-rod engaging the inner arms, a spring to urge the push-rod inwardly to swing the chuck-blocks outwardly to clamping position, and means engaging the outer portion of the push-rod to temporarily withdraw this push-rod to permit the inner chuck-blocks to be withdrawn from article-engaging position.

10. In a fluting machine, a chuck for holding the hollow glass article to be fluted, said chuck comprising a supporting bracket, a hollow shaft rotatably mounted in the bracket, a head-rest mounted on the shaft, means on the head-rest for yieldably engaging the annular open upper end of the hollow article, a clamping block for engaging the closed lower end of the hollow article, a supporting member movably mounted on the bracket, means for rotatably holding the clamping block in the supporting member, a latch for holding the supporting member in position to hold the clamping block in engagement with the hollow article, a push-rod mounted for longitudinal sliding movement in the hollow shaft, an inner chuck block carried by the inner end of the push-rod, a spring for urging the push-rod inwardly to force the chuck block into engagement with the interior of the hollow article, and means engaging with the outer portion of the push-rod to temporarily withdraw the inner chuck block from engagement with the article.

11. In a fluting machine, a chuck for holding the hollow glass article to be fluted, said chuck comprising a supporting bracket, a hollow shaft rotatably mounted in the bracket, a head-rest mounted on the shaft, means on the head-rest for yieldably engaging the annular open upper end of the hollow article, a clamping block for engaging the closed lower end of the hollow article, a supporting member movably mounted on the bracket, means for rotatably holding the clamping block in the supporting member, a latch for holding the supporting member in position to hold the clamping block in engagement with the hollow article, a push-rod mounted for longitudinal sliding movement in the hollow shaft, an inner chuck block carried by the inner end of the push-rod, a spring for urging the push-rod inwardly to force the chuck block into engagement with the interior of the hollow article, means engaging with the outer portion of the push-rod to temporarily withdraw the inner chuck block from engagement with the article, and latch means for temporarily holding the inner chuck block in withdrawn position.

12. In a fluting machine, a chuck for holding the hollow glass article to be fluted, said chuck comprising a supporting bracket, a hollow shaft rotatably mounted in the bracket and having an inwardly projecting threaded portion, a head-rest adjustably threaded on the shaft, a yieldable clamping means on the head-rest for engaging the open upper end portion of the hollow article, a clamping block for engaging the closed lower end of the hollow article, a supporting member movably mounted on the bracket, means for rotatably holding the clamping block in the supporting member, a latch for holding the supporting member in position to hold the clamping block in engagement with the hollow article, a push-rod mounted for longitudinal sliding movement in the hollow shaft, an inner chuck-block carried by the inner end of the push-rod, a spring for urging the push-rod inwardly to force the chuck-block into engagement with the interior of the hollow article, and means engaging with the outer portion of the push-rod to temporarily withdraw the inner chuck from engagement with the article.

13. In a fluting machine, a chuck for holding the hollow glass article to be fluted, said chuck comprising a supporting bracket, a hollow shaft rotatably mounted in the bracket and having an inwardly projecting threaded portion, a head-rest adjustably threaded on the shaft, a yieldable clamping member on the head-rest said clamping member comprising concentric annular clamping lips the adjacent inner faces of which normally diverge to form a groove for receiving the upper edge portion of the glass article, the clamping member yielding inwardly when the article is forced to position to cause the lips to move toward one another and clamp the article, a clamping block for engaging the closed lower end of the hollow article, a supporting member movably mounted on the bracket, means for rotatably holding the clamping block in the supporting member, a latch for holding the supporting member in position to hold the clamping block in engagement with the hollow article, a push-rod mounted for longitudinal sliding movement in the hollow shaft, an inner chuck-block carried by the inner end of the push-rod, a spring for urging the push-rod inwardly to force the chuck-block into engagement with the interior of the hollow-article, and means engaging with the outer portion of the push-rod to temporarily withdraw the inner chuck from engagement with the article.

14. In a fluting machine, a continuously rotating grinding wheel, an article-holding chuck positioned adjacent the peripheral grinding face of the wheel, said chuck comprising a pivotally mounted bracket, article holding chuck members rotatably mounted in the bracket, a ratchet wheel connected with one of the chuck members, a locking pawl yieldably engaging the ratchet, an operating pawl yieldably engaging the ratchet, a carrier for the operating pawl mounted on the bracket, a normally fixed abutment engaged by the carrier, means for swinging the chuck-bracket, means normally actuating said chuck-swinging means to move the article into grinding engagement with the wheel, and means for periodically actuating the chuck-swinging means to move the article away from the wheel and simultaneously swing the carrier toward the abutment to cause the operating pawl to index the ratchet through a predetermined angle.

15. In a fluting machine, a continuously rotating grinding wheel, an article-holding chuck positioned adjacent the peripheral grinding face of the wheel, said chuck comprising a pivotally mounted bracket, article holding chuck members rotatably mounted in the bracket, a ratchet wheel connected with one of the chuck members, a locking pawl yieldably engaging the ratchet, an operating pawl yieldably engaging the ratchet, a carrier for the operating pawl mounted on the bracket, a normally fixed abutment engaged by the carrier, means for swinging the chuck-bracket, means normally actuating said chuck-swinging means to move the article into grinding engagement with the wheel, means for periodically actuating the chuck-swinging means to move the article away from the wheel and simultaneously swing the carrier toward the abutment to cause the operating pawl to index the ratchet through a predetermined angle, and means for automatically holding the chuck bracket in withdrawn position for a predetermined period of time after the completion of a certain number of indexing movements.

16. In a fluting machine, a continuously rotating grinding wheel, an article-holding chuck positioned adjacent the peripheral grinding face of the wheel, said chuck comprising a pivotally mounted bracket, article holding chuck members rotatably mounted in the bracket, a ratchet wheel connected with one of the chuck members, a locking pawl yieldably engaging the ratchet, an operating pawl yieldably engaging the ratchet, a carrier for the operating pawl mounted on the bracket, a machine frame, a supporting plate mounted in the frame for movement substantially parallel to the plane of rotation of the grinding wheel, means for adjusting the position of the supporting plate, a bracket mounted on the plate in which the chuck-bracket is pivoted, a normally fixed abutment mounted on the plate in position to be engaged by the pawl-carrier, means for adjusting the position of the abutment, and means for swinging the chuck-bracket.

17. In a fluting machine, a continuously rotating grinding wheel, an article-holding chuck positioned adjacent the peripheral grinding face of the wheel, said chuck comprising a pivotally mounted bracket, article holding chuck members rotatably mounted in the bracket, a ratchet wheel connected with one of the chuck members, a locking pawl yieldably engaging the ratchet, an operating pawl yieldably engaging the ratchet, a carrier for the operating pawl mounted on the bracket, a machine frame, a supporting plate mounted in the frame for movement substantially parallel to the plane of rotation of the grinding wheel, means for adjusting the position of the supporting plate, a bracket mounted on the plate in which the chuck-bracket is pivoted, a normally fixed abutment mounted on the plate in position to be engaged by the pawl-carrier, means for adjusting the position of the abutment, means for swinging the chuck-bracket, means for normally actuating the chuck-swinging means to move the article into grinding engagement with the wheel, and means for periodically actuating the chuck-swinging means to move the article away from the wheel and simultaneously swing the carrier toward the abutment to cause the operating pawl to index the ratchet through a predetermined angle.

18. In a fluting machine, a continuously rotating grinding wheel, an article-holding chuck positioned adjacent the peripheral grinding face of the wheel, said chuck comprising a pivotally mounted bracket, article holding chuck members rotatably mounted in the bracket, a ratchet wheel connected with one of the chuck members, a locking pawl yieldably engaging the ratchet, an operating pawl yieldably engaging the ratchet, a carrier for the operating pawl mounted on the bracket, a machine frame, a supporting plate mounted in the frame for movement substantially parallel to the plane of rotation of the grinding wheel, means for adjusting the position of the supporting plate, a bracket mounted on the plate in which the chuck-bracket is pivoted, a normally fixed abutment mounted on the plate in position to be engaged by the pawl-carrier, means for adjusting the position of the abutment, means for swinging the chuck-bracket, means for normally actuating the chuck-swinging means to move the article into grinding engagement with the wheel, means for periodically actuating the chuck-swinging means to move the article away from the wheel and simultaneously swing the carrier toward the abutment to cause the operating pawl to index the ratchet through a predetermined angle, and means for automatically holding the chuck bracket in withdrawn position for a predetermined period of time after the completion of a certain number of indexing movements.

19. In a fluting machine, a continuously rotating grinding wheel, an article holding chuck positioned adjacent the peripheral grinding face of the wheel, means for moving the chuck toward or from the grinding wheel said means comprising a lever, means associated with the chuck for indexing the article held thereby through a predetermined angle each time it is moved out of engagement with the wheel, means for normally swinging the lever in one direction to bring the article into grinding engagement with the wheel, means for swinging the lever in the other direction to move the article away from the wheel comprising a rotatable indexing cam, and means for rotating the cam, a hold-out cam, means for rotating the hold-out cam once during the time the article has been indexed to complete a circular series of flutes on the article, a hold-out mechanism adapted when in operative position to engage the lever and hold it in substantially the position to which it is moved by the indexing cam when the article is moved away from the wheel, the hold-out cam engaging this mechanism to move it to operative position, and means for moving the hold-out mechanism to inoperative position when the lever is again actuated by the indexing cam.

20. In a fluting machine, a continuously rotating grinding wheel, an article holding chuck positioned adjacent the peripheral grinding face of the wheel, means for moving the chuck toward or from the grinding wheel said means comprising a lever, means associated with the chuck for indexing the article held thereby through a predetermined angle each time it is moved out of engagement with the wheel, means for normally swinging the lever in one direction to bring the article into grinding engagement with the wheel, means comprising a rotary cam for periodically moving the lever in the other direction to move the article away from the wheel while an indexing operation is accomplished, and means comprising a second rotary cam for holding the lever in substantially the position to which it is moved by the first mentioned cam for a longer period of time after one complete cycle of indexing operations have been accomplished.

21. In a fluting machine, a continuously rotating grinding wheel, an article holding the chuck positioned adjacent the peripheral grinding face of the wheel, means for moving the chuck toward or from the grinding wheel said means comprising a lever, means associated with the chuck for indexing the article held thereby through a predetermined angle each time it is moved out of engagement with the wheel, means for normally swinging the lever in one direction to bring the article into grinding engagement with the wheel, means comprising a rotary cam for periodically moving the lever in the other direction to move the article away from the wheel during a portion of each rotation of the cam, and means periodically engaging the lever to hold the article away from the wheel during a complete rotation of the cam.

22. In a fluting machine, a continuously rotating grinding wheel, an article holding chuck positioned adjacent the peripheral grinding face of the wheel, means for moving the chuck toward or from the grinding wheel said means comprising a lever, means associated with the chuck for indexing the article held thereby through a predetermined angle each time it is moved out of engagement with the wheel, means for normally swinging the lever in one direction to bring the article into grinding engagement with the wheel, means comprising a rotary cam for engaging and moving the lever in the other direction to move the article away from the wheel once for each rotation of the cam, and means comprising a second rotary cam for holding the lever in substantially the position to which it is moved by the first cam during one rotation of the first cam, after one complete cycle of indexing operations have been accomplished.

23. In a fluting machine, a continuously rotating grinding wheel, an article holding chuck positioned adjacent the peripheral grinding face of the wheel, means for moving the chuck toward or from the grinding wheel said means comprising a lever, means associated with the chuck for indexing the article held thereby through a predetermined angle each time it is moved out of engagement with the wheel, means for normally swinging the lever in one direction to bring the article into grinding engagement with the wheel, means comprising a rotary cam for engaging and moving the lever in the other direction to move the article away from the wheel once for each rotation of the cam, a hold-out means adapted when in operative position to engage and hold the lever in substantially the position to which it is moved by the cam during one rotation of the cam, and means comprising a second rotary cam for moving the holdout means to operative position after one complete series of indexing operations has been accomplished.

24. In a machine for grinding hollow glass articles, a chuck mechanism for holding the article, a rotary grinding tool, means for continuously rotating the tool, a pivotally mounted holder for the tool, lever mechanism for swinging the holder to bring the tool into and out of engagement with the article, means for normally actuating the lever mechanism to hold the tool in grinding engagement with the article, means including a rotary cam having a portion which periodically engages the lever mechanism to move the tool out of engagement with the article and hold it out for a portion of each rotation of the cam, and means periodically engaging the lever mechanism to hold the tool out of grinding position while the cam is out of engagement with the lever mechanism.

25. In a machine for grinding hollow glass articles, a continuously rotating grinding wheel, a chuck mechanism for holding the article to be ground, means for normally moving the chuck to hold the article in grinding relation with the wheel, means for periodically moving the chuck away from the wheel and indexing the article to present a new surface to the wheel, a rotary grinding tool, means for rotating the tool, means tending to normally move the tool into engagement with the article held by the chuck, and means for holding the tool out of engagement with the article except for a portion of each time that the article is held in grinding engagement with the grinding wheel.

26. In a machine for grinding hollow glass articles, a continuously rotating grinding wheel, a chuck mechanism for holding the article to be ground, means for normally moving the chuck to hold the article in grinding relation with the wheel, means for periodically moving the chuck away from the wheel and indexing the article to present a new surface to the wheel, a rotary grinding tool, means for rotating the tool, and means for moving the tool into engagement with the article for a portion of each time that the article is in grinding engagement with the grinding wheel.

27. In a machine for grinding hollow glass articles, a continuously rotating wheel for grinding fluted surfaces on the article, a chuck mechanism for holding the article to be ground, means for normally moving the chuck to hold the article in grinding relation with the wheel, means for periodically moving the chuck away from the wheel and indexing the article to present a new surface to be fluted to the wheel, means for holding the chuck and article away from the wheel for a predetermined longer period of time after the circular series of fluted surfaces have been completed, a rotary grinding tool, means for rotating the tool, and means for moving the tool into engagement with the article for a portion of each time that the article is in position for grinding a fluted surface and for holding the tool out of engagement with the article at all other times.

28. In a machine for grinding hollow glass articles, a continuously rotating wheel for grinding fluted surfaces on the article, a chuck mechanism for holding the article to be ground, means for normally moving the chuck to hold the article in grinding relation with the wheel, means for periodically moving the chuck away from the wheel and indexing the article to present a new surface to be fluted to the wheel, means for holding the chuck and article away from the wheel for a predetermined longer period of time after the circular series of fluted surfaces have been completed, a rotary grinding tool, means for rotating the tool, means tending to normally move the tool into engagement with the article held by the chuck, and means for holding the tool out of engagement with the article except for a portion of each time that the article is in engagement with the grinding wheel.

29. In a machine for grinding hollow glass articles, a continuously rotating wheel for grinding fluted surfaces on the article, a chuck mechanism for holding the articles to be ground, means for normally moving the chuck to hold the article in grinding relation with the wheel, means for periodically moving the chuck away from the wheel and indexing the article to present a new surface to be fluted to the wheel, means including a rotary cam for holding the chuck and article away from the wheel for a predetermined longer period of time after the circular series of fluted surfaces have been completed, an electric switch, means for closing the switch positioned so as to be actuated by the cam a short time before the holding means is operated, and a circuit including the switch and a signal that indicates to the attendant when the chuck is to be held away for this longer period of time.

HAROLD R. SCHUTZ.